United States Patent
Krishnan (10) Patent No.: US 10,805,433 B2
(45) Date of Patent: *Oct. 13, 2020

(54) SYSTEM HAVING A PROTOCOL INDEPENDENT CONFIGURATION ENVIRONMENT

(71) Applicant: Honeywell International Inc., Morris Plains, NJ (US)

(72) Inventor: Ravi Bharathi Krishnan, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,560

(22) Filed: Nov. 26, 2018

(65) Prior Publication Data

US 2019/0109928 A1 Apr. 11, 2019

Related U.S. Application Data

(63) Continuation of application No. 15/171,792, filed on Jun. 2, 2016, now Pat. No. 10,142,447.

(51) Int. Cl.
*G06F 15/16* (2006.01)
*H04L 29/06* (2006.01)
(Continued)

(52) U.S. Cl.
CPC ............ *H04L 69/18* (2013.01); *G06F 9/4411* (2013.01); *H04L 41/08* (2013.01); *H04L 69/02* (2013.01); *H04L 69/24* (2013.01); *H04L 69/26* (2013.01)

(58) Field of Classification Search
CPC ......... H04L 69/18; H04L 41/08; H04L 69/02; H04L 69/24; H04L 69/26; G06F 9/4411
See application file for complete search history.

(56) References Cited

U.S. PATENT DOCUMENTS

| 8,640,120 B2 | 1/2014 | Gutha et al. |
| 8,793,668 B2 * | 7/2014 | Gutha ...................... G06F 8/34 709/230 |

(Continued)

OTHER PUBLICATIONS

"Introduction of the Stryker Controller," 7 pages, created on Feb. 26, 2016.

(Continued)

*Primary Examiner* — Cheikh T Ndiaye
(74) *Attorney, Agent, or Firm* — Seager, Tufte & Wickhem LLP (57) ABSTRACT

A system and approach that may provide a protocol independent environment to configure an ASC (application specific control) device in, for example, a heating, ventilation and air conditioning system. By using this system and approach, a user may reuse a device configuration already done for a device of one protocol in a device of another protocol without being required to reconfigure the latter device from scratch. This way may help a user to reduce the total setup time required to fully configure a device. The reduction may be done by simply exporting the configuration information from the first device and then importing the configuration information into the second device, where the internal protocol specific details can be handled internally by a tool. Thus, a user need not bother with the details that are in the background of the moving a configuration among devices of different protocols.

20 Claims, 13 Drawing Sheets

(51) Int. Cl.
    *G06F 9/4401*     (2018.01)
    *H04L 12/24*     (2006.01)

(56) References Cited

U.S. PATENT DOCUMENTS

| | | | | |
|---|---|---|---|---|
| 2003/0074459 | A1* | 4/2003 | Soemo | H04L 67/12 709/230 |
| 2004/0059814 | A1* | 3/2004 | Komiya | G06F 16/258 709/224 |
| 2011/0160879 | A1 | 6/2011 | Gutha et al. | |
| 2011/0161992 | A1* | 6/2011 | Gutha | G06F 8/34 719/329 |
| 2013/0024028 | A1 | 1/2013 | Hadzidedic | |
| 2014/0344427 | A1* | 11/2014 | Coleman | H04L 12/2836 709/222 |
| 2015/0106447 | A1* | 4/2015 | Hague | H04L 12/2818 709/204 |

OTHER PUBLICATIONS http://www.csimn.com/CSI_pages/BB2-7020.html, "LonWorks to BACnet IP Gateways: Control Solutions," 2 pages, printed May 11, 2015.

http://www.csimn.com/CSI_pages/BB2-7020.html, LonWorks to BACnet IP Gateway: Babel Buster BB20-7020, 4 pages, printed Feb. 14, 2017.

"Related Art Document," 5 pages, created Feb. 29, 2016.

The International Search Report and Written Opinion in PCT Application No. PCT/US2017/035497 dated Sep. 11, 2017.

\* cited by examiner

VAV Configuration Wizard
Configure General and Daylight saving settings

- Configuration
- VAV Outputs
- VAV Inputs
- Temperature Setpoints
- Flow Setpoints
- Control Parameters
- Schedule
- PID
- Accessory Loops
- Custom Wiring

73

Configuration 62

General Settings

| | |
|---|---|
| Controller Type | With Actuator ▼ — 63 |
| Pressure Type | ◆ Pressure Independent  ◇ Pressure Dependent — 64 |
| Box Type | Single Duct ▼ — 65 |
| Flow Type | Flow Normal ▼ — 66 |
| Wall Module Type | TR71/75 Wall Module ▼ — 67 |
| Controller Power Up Disable Time | 10  S [1-300] — 68 |

☐ Set Time During Download — 69

Daylight Savings Settings

☐ Enable Daylight Savings

| | | | |
|---|---|---|---|
| Start Month | Unconfigured | Start Day | Unconfigured |
| End Month | Unconfigured | End Day | Unconfigured |

VAV Configuration Wizard
Configure General and Daylight saving settings

- Configuration
- VAV Outputs
- VAV Inputs  87
- Temperature Setpoints
- Flow Setpoints
- Control Parameters
- Schedule
- PID
- Accessory Loops
- Custom Wiring

Configuration — 76

General Settings

| | |
|---|---|
| Controller Type | With Actuator ▼ — 77 |
| Pressure Type | ◇ Pressure Independent   ◇ Pressure Dependent — 78 |
| Box Type | Single Duct ▼ — 79 |
| Flow Type | Flow Normal ▼ — 81 |
| Wall Module Type | TR71/75 Wall Module ▼ — 82 |
| Controller Power Up Disable Time | 10   S [1-300] — 83 |

☐ Set Time During Download — 84

Daylight Savings Settings
☐ Enable Daylight Savings

| | | | |
|---|---|---|---|
| Start Month | Unconfigured | Start Day | Unconfigured |
| End Month | Unconfigured | End Day | Unconfigured |

SYSTEM HAVING A PROTOCOL INDEPENDENT CONFIGURATION ENVIRONMENT

This present application is a continuation of U.S. patent application Ser. No. 15/171,792, filed Jun. 2, 2016. U.S. patent application Ser. No. 15/171,792, filed Jun. 2, 2016, is hereby incorporated by reference.

BACKGROUND

The present disclosure pertains to device configurations in view of various protocols.

SUMMARY

The disclosure reveals a system and approach that may provide a protocol independent environment to configure an ASC (application specific control) device in, for example, a heating, ventilation and air conditioning system. By using this system and approach, a user may reuse a device configuration already done for a device of one protocol in a device of another protocol without being required to reconfigure the latter device from scratch. This way may help a user to reduce the total setup time required to fully configure a device. The reduction may be done by simply exporting the configuration information from the first device and then importing the configuration information into the second device, where the internal protocol specific details can be handled internally by a tool. Thus, a user need not bother with the details that are in the background of the moving a configuration among devices of different protocols.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Reference may be made to symbols in the drawing. Symbols may have virtually any shape (e.g., a block) and may designate hardware, objects, activities, steps, procedures, and other items.

Some solutions that may be of concern incorporate a protocol independent environment to configure an ASC (application specific control) in HVAC (heating, ventilation and air conditioning) controllers. The protocol independent environment may help a user reduce a total setup time needed to fully configure, for example, a VAV (variable air volume) device. Other kinds of devices may also be configured in such an environment.

The present system and approach may provide the protocol independent environment to configure an ASC in an HVAC. By using the system and approach, a user may reuse the device configuration, already done for the Lon Stryker VAV device, in a BACnet Stryker VAV device without being required to reconfigure the device from scratch. This way may help a user to reduce the total setup time required to fully configure a Stryker VAV device. The reduction may be done by simply exporting the configuration information from the Lon Stryker VAV device and then importing the configuration information into the BACnet Stryker VAV device, where the internal protocol specific details are handled internally by a tool. A user need not bother with the details that are in the background of moving a configuration.

Figure 1:
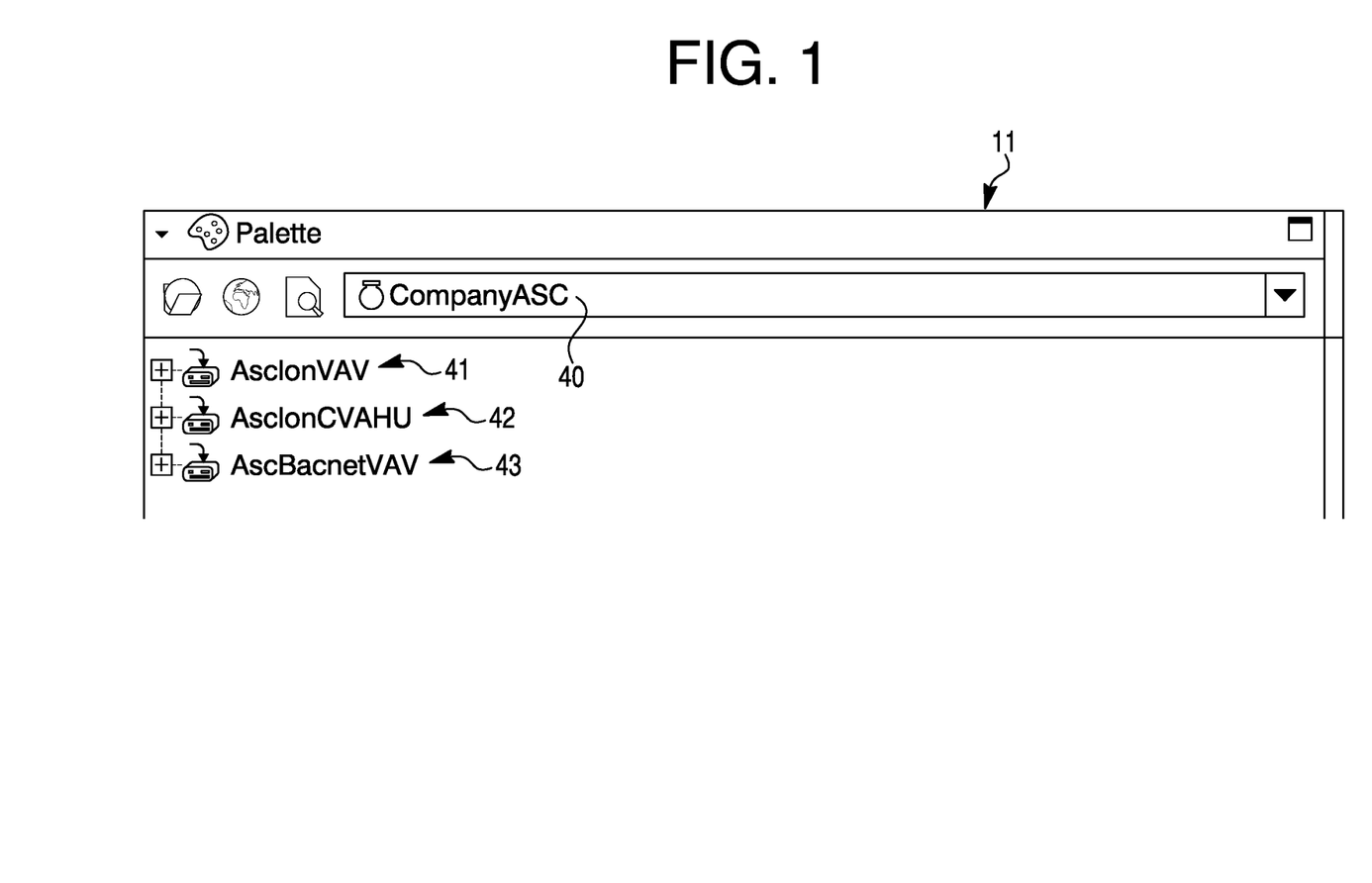
FIG. 1 is a diagram of workbench palette.
Figure 2:
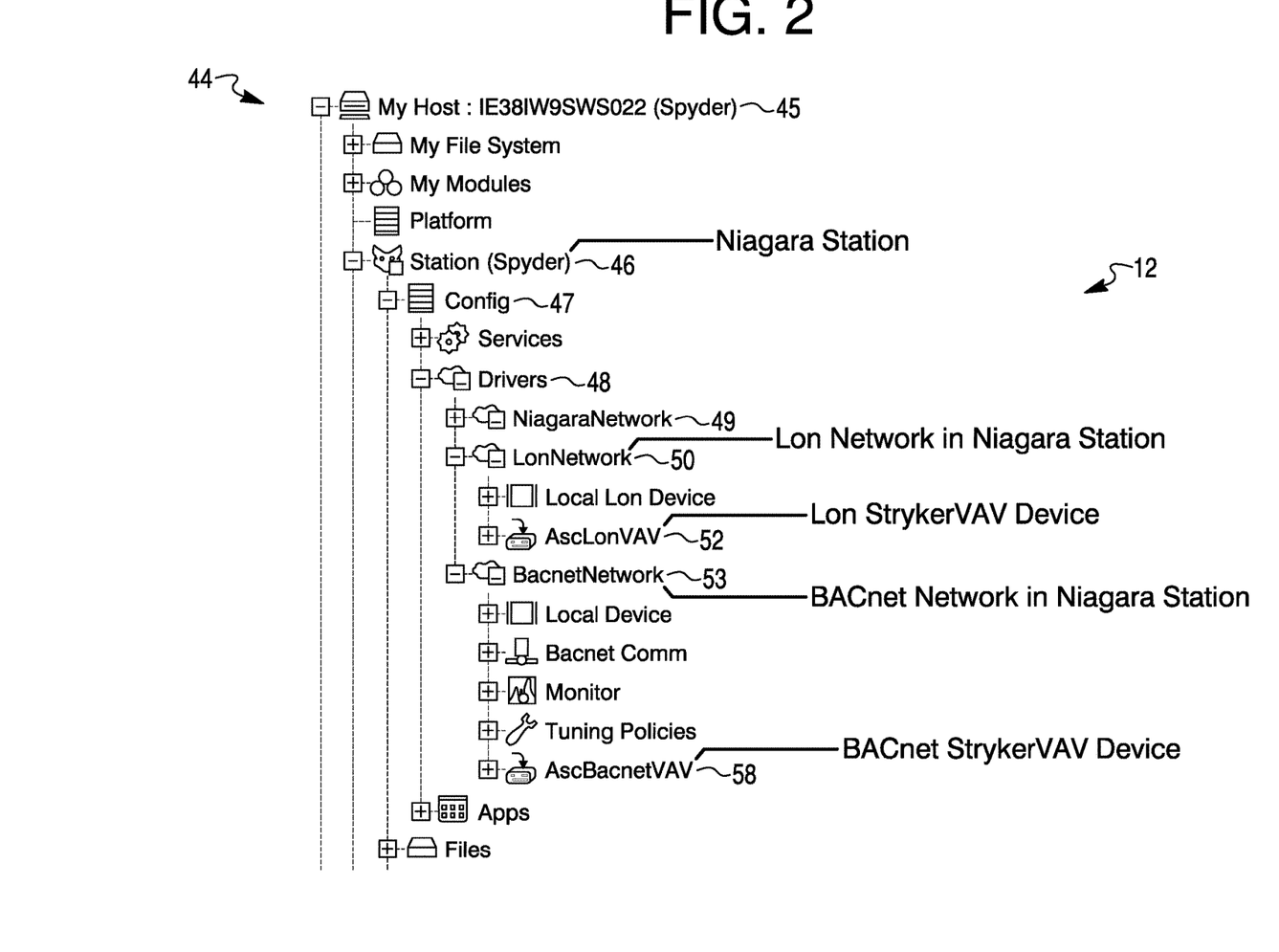
FIG. 2 is a diagram showing a palette of variable air volume devices of different protocols in a station.

The following items reveal a workflow of the present approach. A user may see the Honeywell Stryker™ devices, as illustrative devices, under a Niagara™ workbench palette 11 in FIG. 1 that can be added into Niagara station and commissioned with the actual controller and be used. A Stryker device may be a controller. Palette 11 may show "CompanyAsc" as a title in space 40 and show a listing of devices entitled "AscLonVAV", "AscLonCVAHU" and "AscBacnetVAV", in lines 41, 42 and 43, respectively. The user may need to add Lon™ or BACnet™ network under a Niagara station at line 45 of palette 44 in order to use the Lon Stryker VAV or BACnet Stryker VAV devices in the station as shown in a diagram 12 of FIG. 2. A host may be noted at line 45 and a station at line 46 of palette 44. A station of line 46 may be a Niagara station. Below line 46 may be a configuration line 47 and drivers at line 48. A Niagara network may be listed at line 49. A Lon network in the Niagara station may be listed at line 50. Listed under the Lon Network at line 50 may be AscLonVAV that may be a Lon Stryker VAV device at line 52. Listed under the drivers at line 48 may be a BACnet network in Niagara station at line 53. Listed under the BACnet network at line 53 may be AscBacnetVAV that is a BACnet Stryker VAV device at line 58. AscLonVAV of line 52 may be noted on line 41 of palette 11 of FIG. 1. AscBacnetVAV of line 58 of FIG. 2 may be noted on line 43 of palette 11. The term "palette" used in the present description may be substituted with another term such as a "navigation (nav) tree", "tree", "menu", or another like term.

Figure 3:
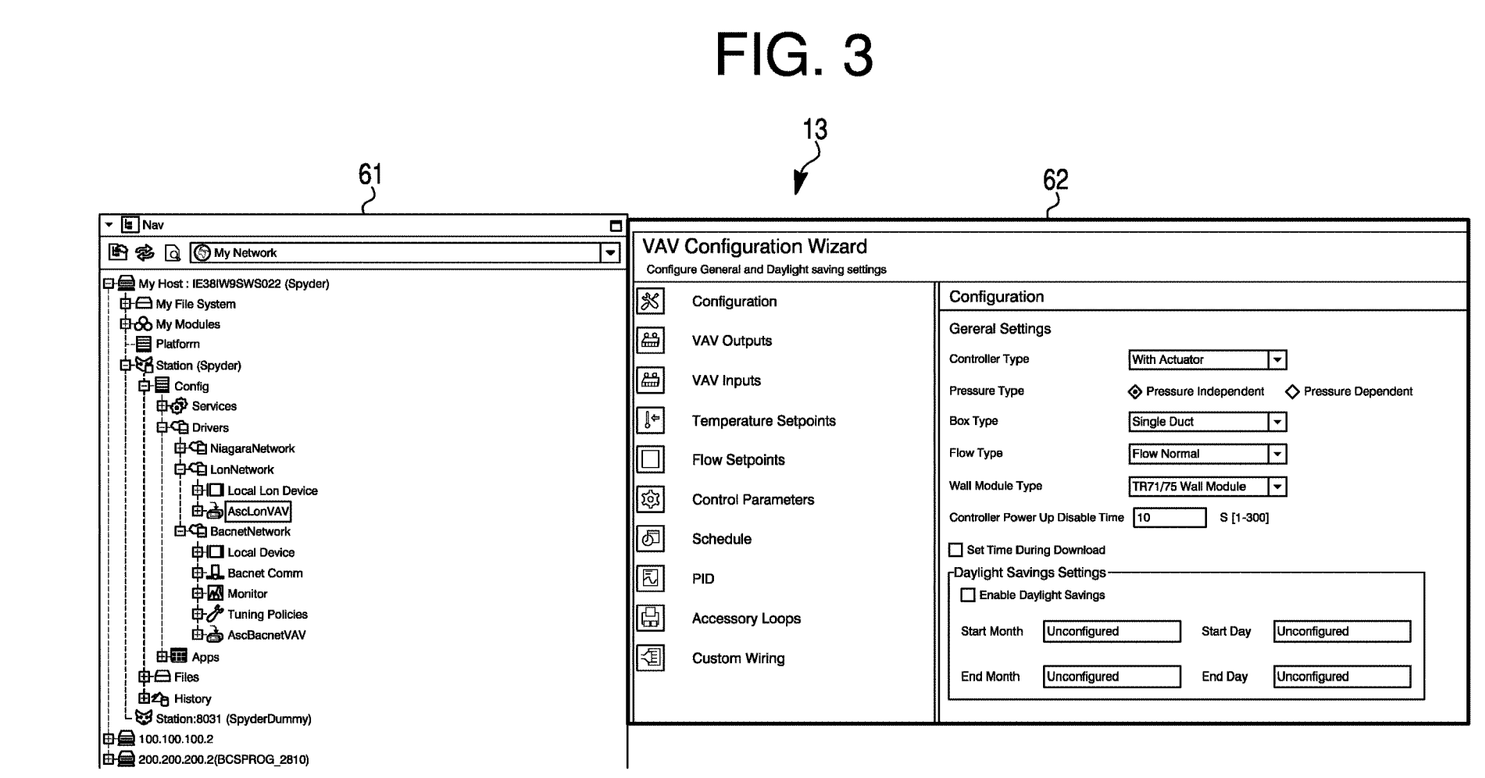
FIG. 3 is a diagram of a wizard based screen used to configure a variable air volume device of a first protocol.
Figure 4:
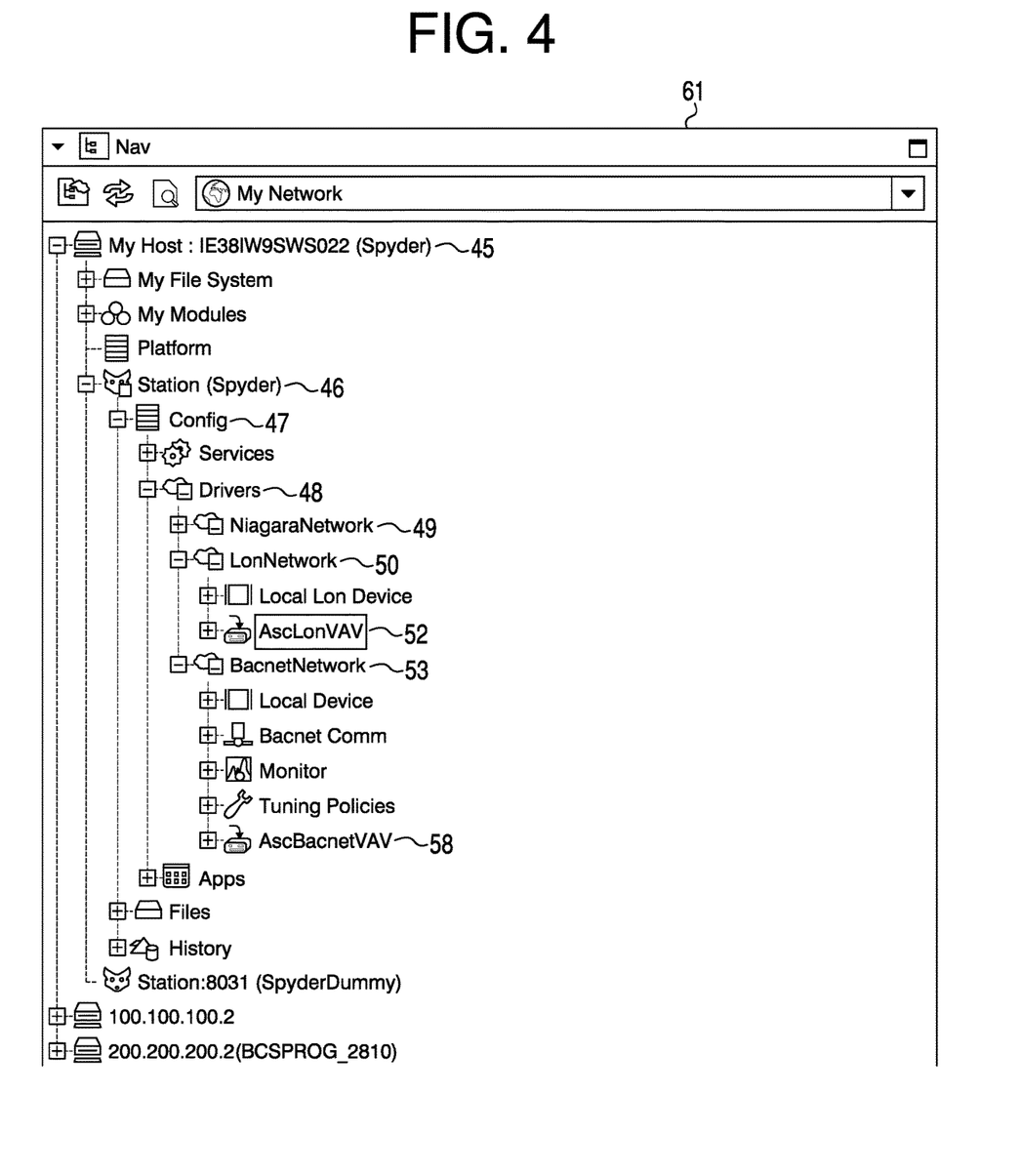
FIG. 4 is a diagram of an enlarged view of a palette in the diagram of FIG. 3.

The user may have a wizard based screen 13 to configure the Lon Stryker VAV device as shown in FIG. 3. Screen 13 may incorporate a palette 61 and a VAV configuration wizard 62. A visual enlargement of palette 61 is shown in FIG. 4. Palette 61 may resemble palette 44 in FIG. 2. A featured item may be an AscLonVAV (Lon Stryker VAV device) at line 52 of palette 61.

Figure 5:
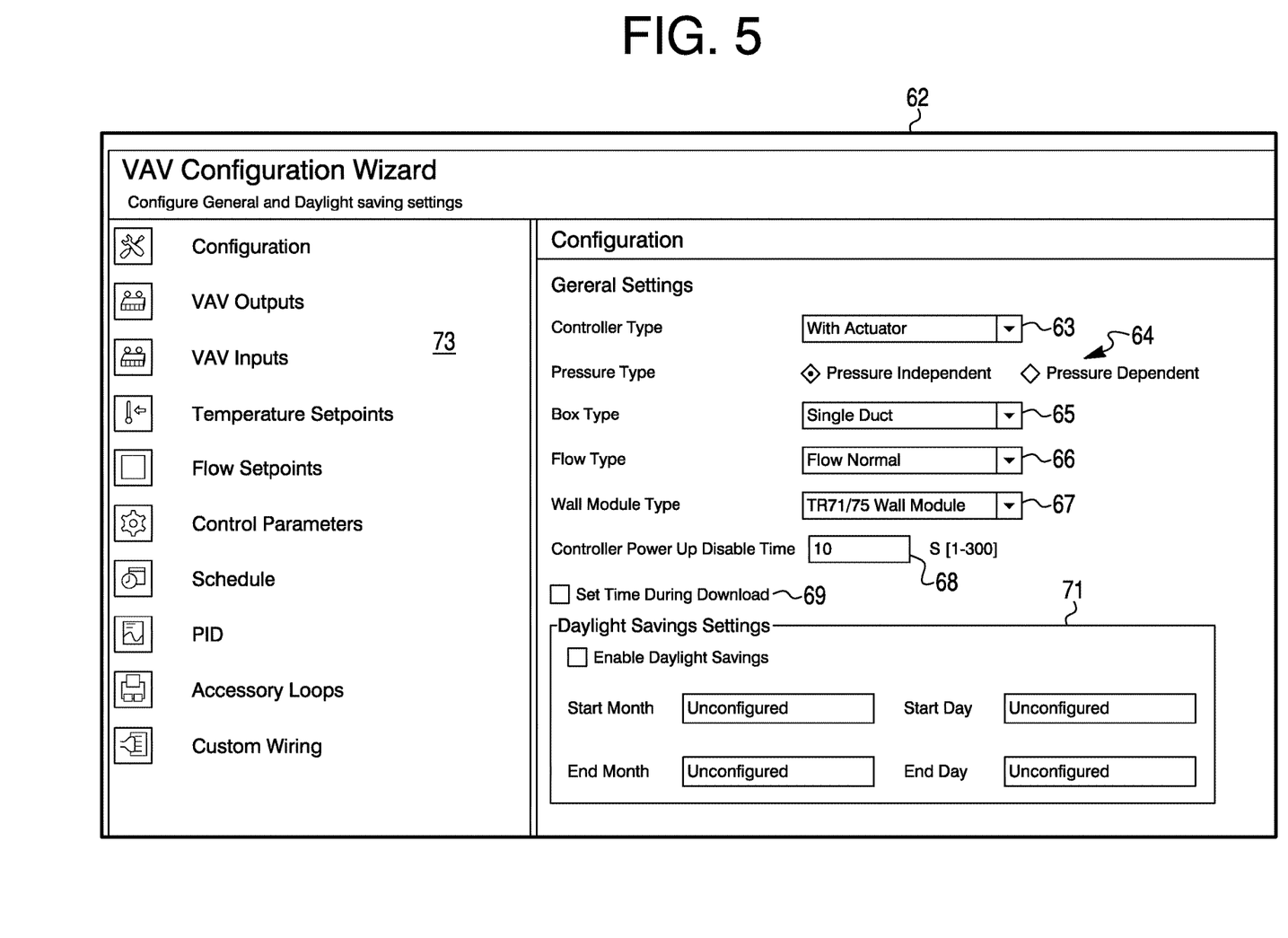
FIG. 5 is a diagram of an enlarged view of a wizard in the diagram of FIG. 3.

An enlarged view of wizard 62 is shown in FIG. 5. One instance of settings in a menu for a configuration of a VAV may indicate a controller type with an actuator at an entry 63, a pressure type at an entry 64, a box type of a single duct at an entry 65, a normal flow type at an entry 66, a Honeywell model TR71/75™ wall module type at an entry 67, a controller power up disable time of 10 seconds selected from a range of 1 to 300 seconds at an entry 68, and a set time during a download at an entry 69. Entries 63-68 may have other selections than those shown. An entry 69 may have an entry of a set time during download despite a present absence of it. Entries 71 may be for daylight savings settings. Other settings may be indicated at a column in an area 73 of wizard 62. Such settings, for example, may incorporate VAV outputs, VAV inputs, temperature setpoints, flow setpoints, control parameters, schedule, PID, accessory loops, custom wiring, and possibly more items, depending on a kind of device one has and its properties.

Figure 6:
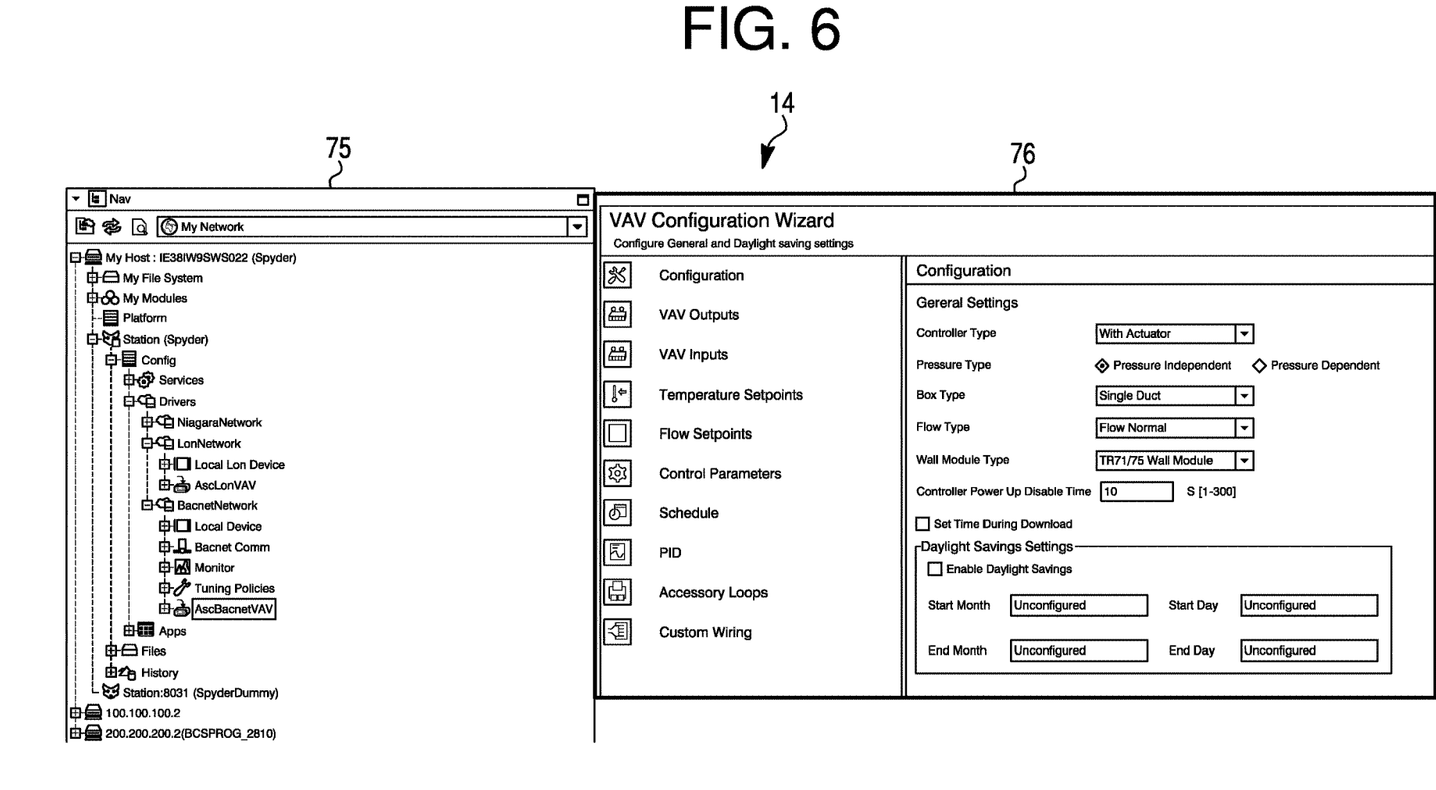
FIG. 6 is a diagram of a wizard based screen used to configure a variable air volume device of a second protocol.
Figure 7:
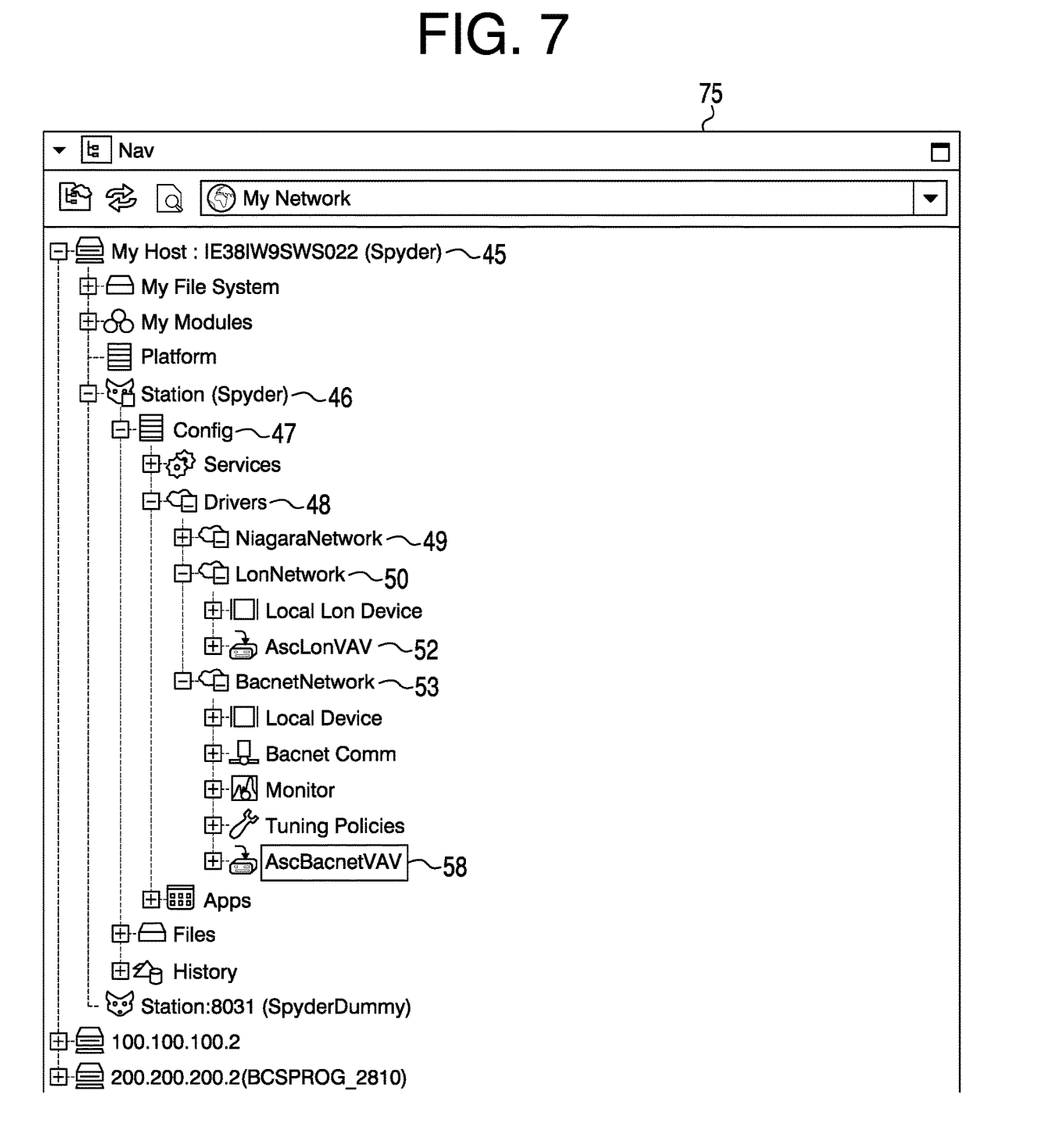
FIG. 7 is a diagram of an enlarged view of a palette in the diagram of FIG. 6.

The user may have a similar wizard based screen 14 as like a Lon Stryker VAV device to configure the BACnet Stryker device while hiding the protocol specific details from the user as shown in FIG. 6. Screen 14 may incorporate a palette 75 and VAV configuration wizard 76. An enlarged view of palette 75 is shown in FIG. 7. Palette 75 may resemble palettes 44 and 61 in FIGS. 2 and 4, respectively. A featured item is AscBacnetVAV (BACnet Stryker VAV device) at line 58.

Figure 8:
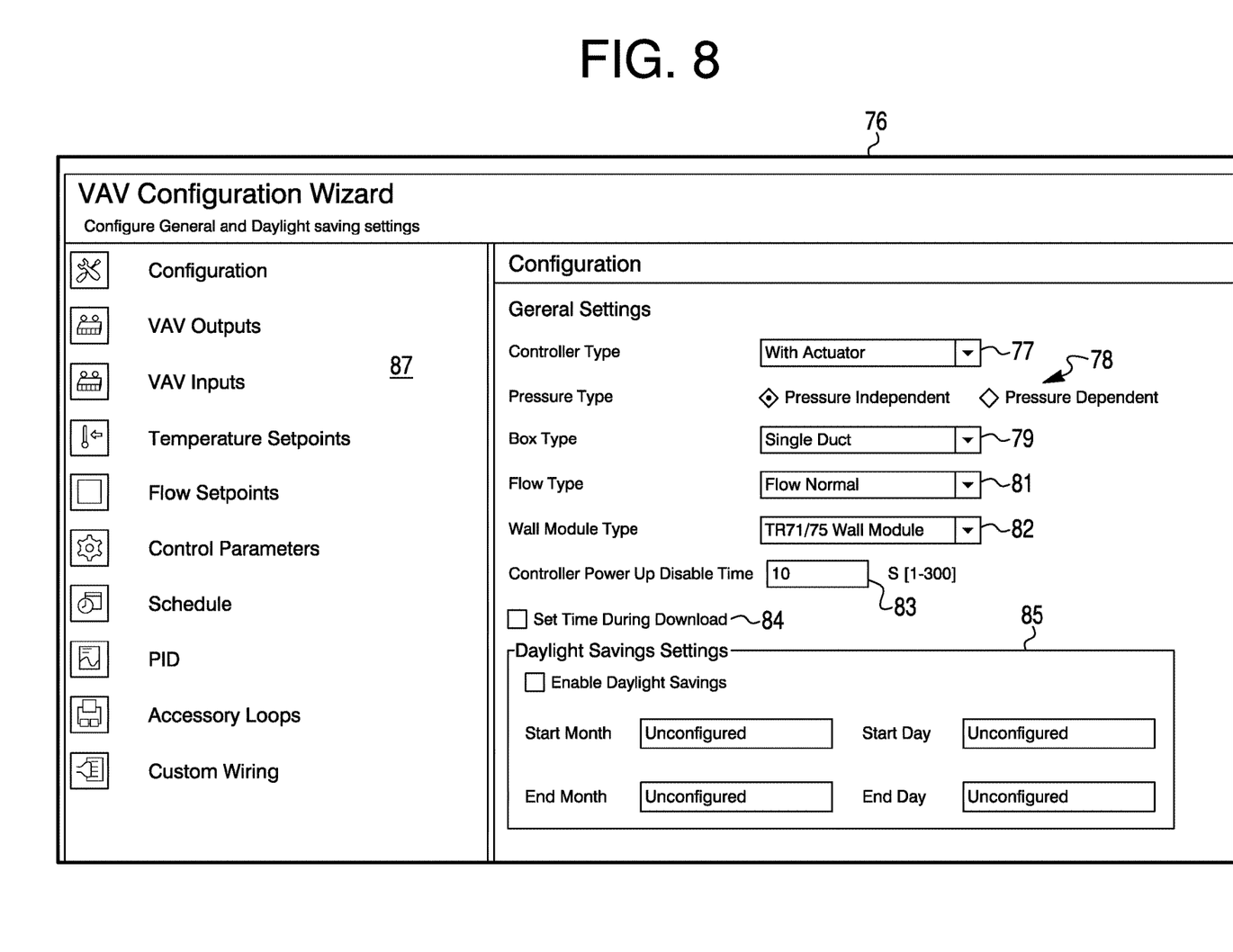
FIG. 8 is a diagram of an enlarged view of a wizard in the diagram of FIG. 6.

An enlarged view of wizard 76 is shown in FIG. 8. An instance of settings of a VAV may indicate a controller type with an actuator at an entry 77, a pressure type at an entry 78, a box type of a single duct at an entry 79, a normal flow type at an entry 81, a model TR71/75™ wall module type at an entry 82, a controller power up disable time of 10 seconds selected from a range of 1 to 300 seconds at an entry 83, and a set time during a download at an entry 84. Entries 77-79 and 81-83 may have other selections than those shown. An entry 84 may have a set time during download despite a present absence of it. Entries 85 may be for daylight savings settings. Other settings may be indicated at a column in an area 87 of wizard 76. Such settings, for example, may incorporate VAV outputs, VAV inputs, temperature setpoints, flow setpoints, control parameters, schedule, PID, accessory loops, custom wiring, and possibly more items, depending on what kind of device that one has and its properties. Wizard 76 may be similar to wizard 62 and be like a Lon Stryker VAV device to configure a BACnet Stryker device in that the specific protocol details are hidden from a user. Incidentally, a reversal of the approach may also be utilized.

A user who already has the Lon Stryker VAV device may need to use the BACnet Stryker VAV device in the same job or in a different job similar to the Lon Stryker VAV device need not have to reconfigure the BACnet Stryker VAV device from scratch; instead the user may export the current configuration available in Lon Stryker VAV device into the BACnet Stryker VAV device.

Figure 9:
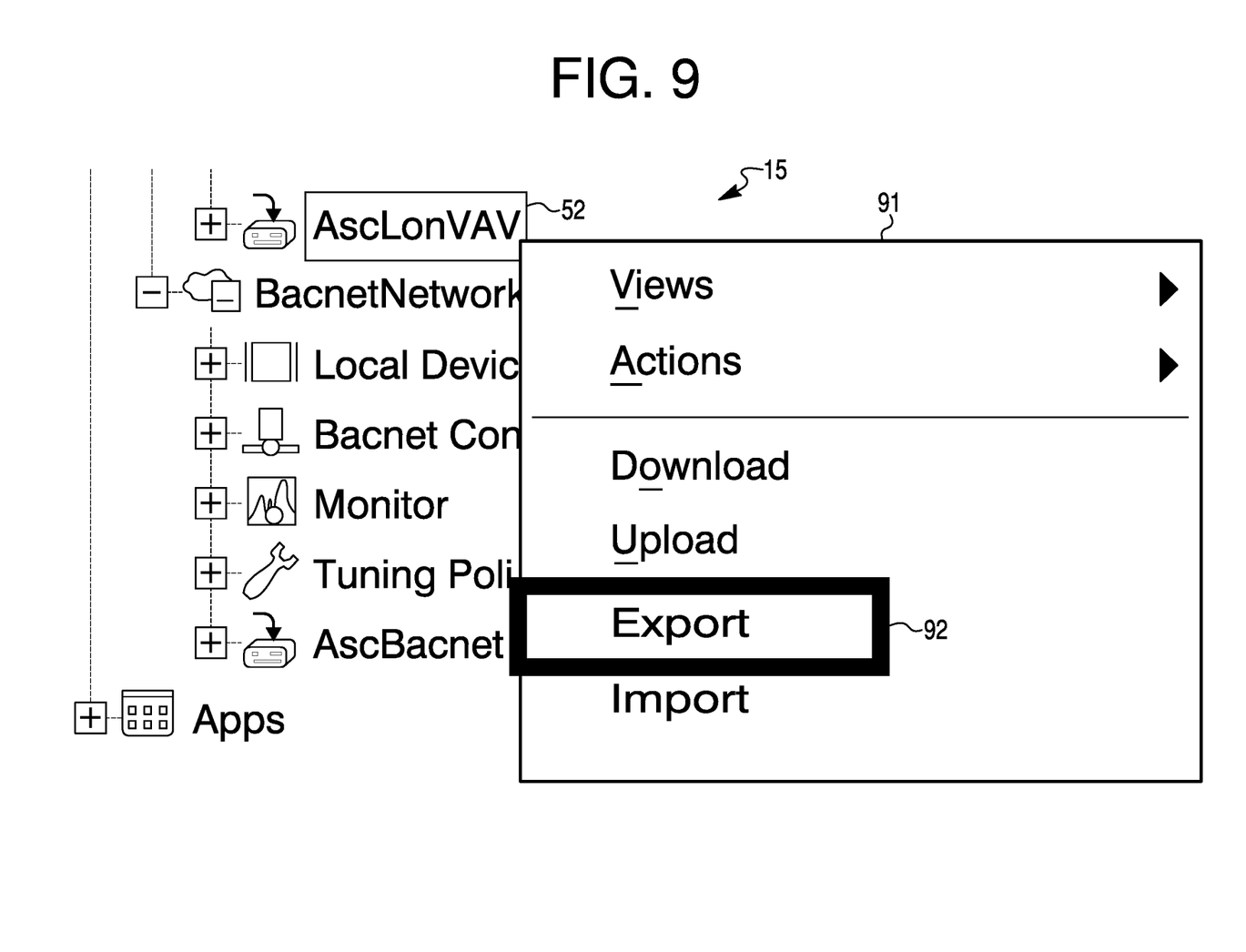
FIG. 9 is a diagram of submenu for exporting a configuration from a device of a first protocol.
Figure 10:
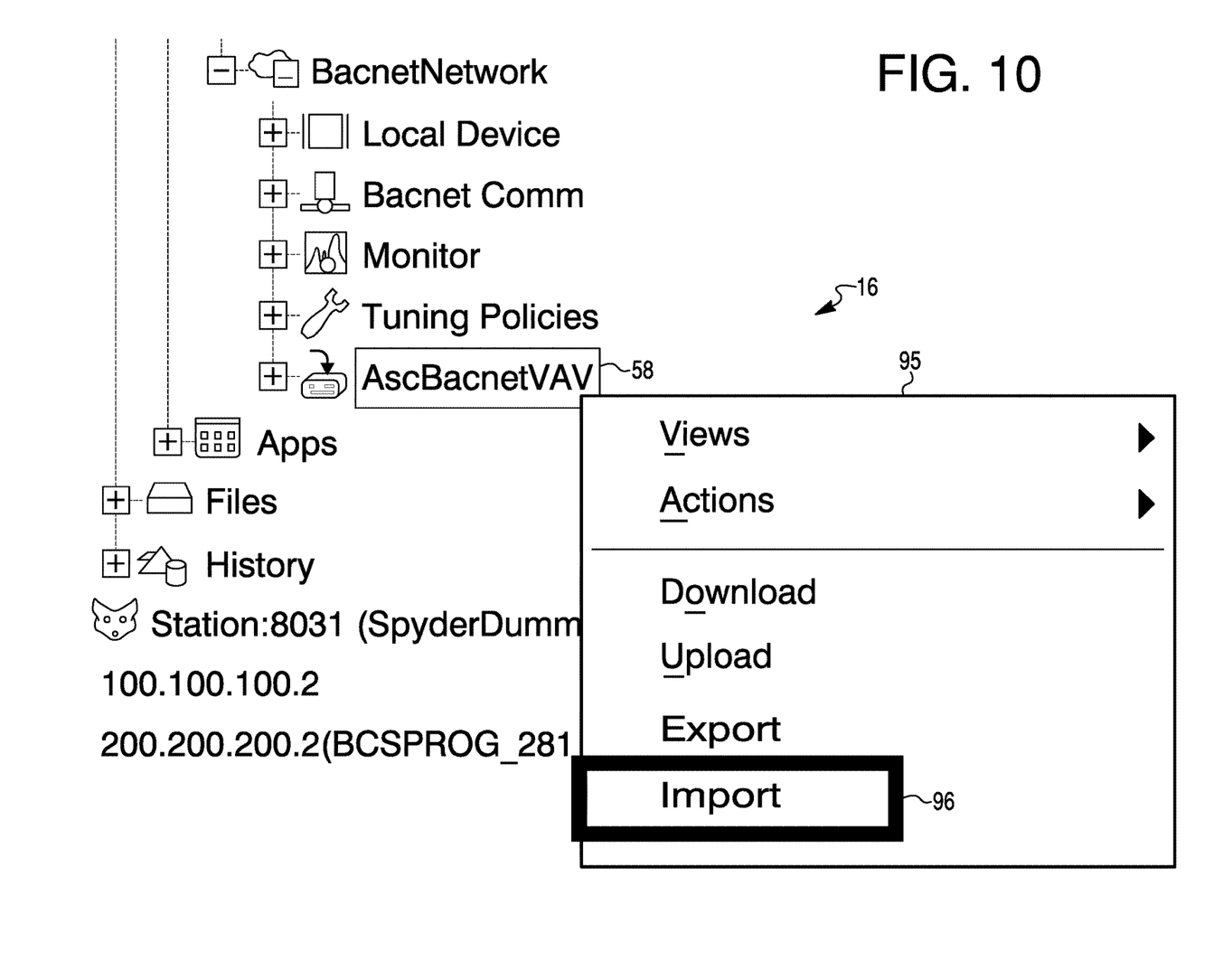
FIG. 10 is a diagram of submenu for importing a configuration into a device of a second protocol.

One may click on AscLonVAV at line 52 of diagram 15 of palette 61 to get a submenu 91 in FIG. 9 that shows items of views, actions, download, upload, export and import. One may click on an "Export" nomenclature 92 to export a configuration from a Lon Stryker VAV device. Then one may click on AscBacnetVAV at line 58 of diagram 16 of palette 75 to get a submenu 95 in FIG. 10 that shows items of views, actions, download, upload, export and import. One may click on an "Import" nomenclature 96 to import the configuration into BACnet Stryker VAV device. One may also reuse the configuration from the BACnet Stryker VAV device into a Lon Stryker VAV device. In a similar manner, one may export a configuration from the BACnet Stryker VAV device and then import it into the Lon Stryker VAV device.

Figure 11:
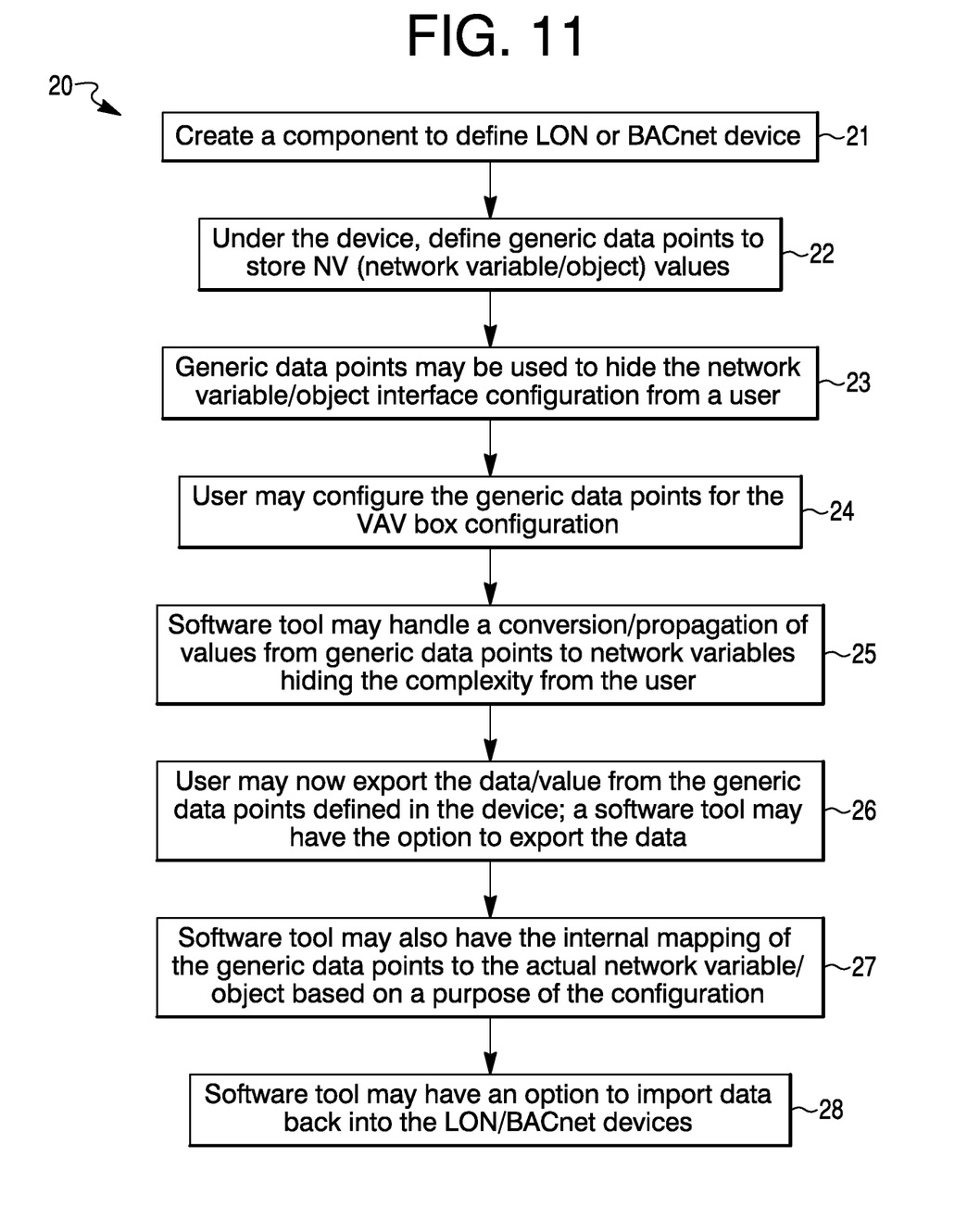
FIG. 11 is a diagram of an activity flow chart for a protocol independent configuration environment.

FIG. 11 is a diagram of an activity flow chart 20 for a protocol independent configuration environment. Symbol 21 may indicate creating a component to define a LON or BACnet type of device. Under the device may be a defining of generic data points to store NV (network variable/object) values, as noted in symbol 22. The generic data points may be used to hide a network variable/object interface configuration from a user, as indicated by symbol 23. In symbol 24, the user may configure the generic points for a VAV box configuration.

Symbol 25 may indicate that a software tool can handle a conversion or propagation of values from generic data points to network variables hiding a complexity from the user. The user may now export a data/value from the generic data points defined in the device, and a software tool may have an option to export the data, as noted in symbol 26.

The software tool may also provide internal mapping of the generic data points to actual network variables/objects based on a purpose of the configuration, as indicated by symbol 27. The software tool may have an option to import the data back into the LON/BACnet devices, as noted at symbol 28.

Figure 12:
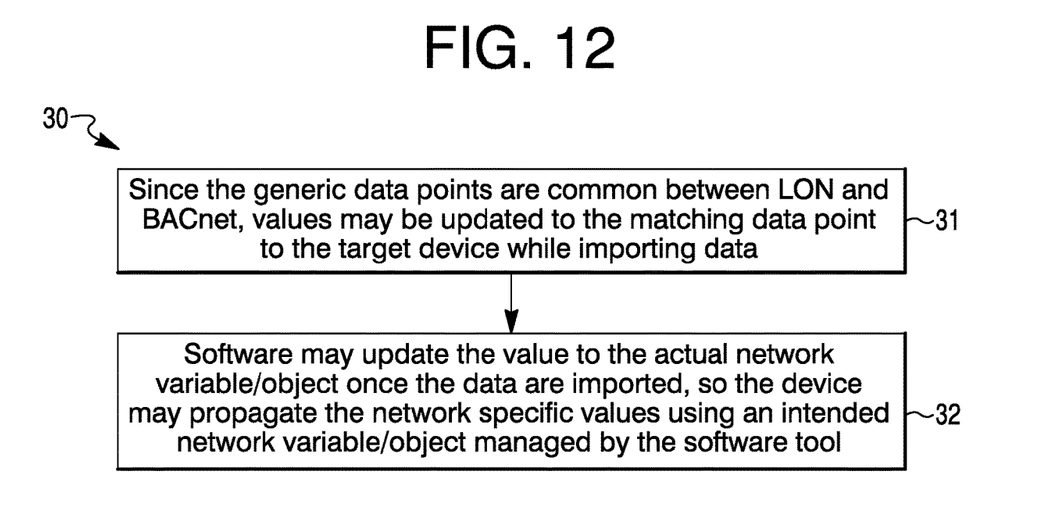
FIG. 12 is a diagram of a further activity flow chart related to the flow chart of FIG. 11.

FIG. 12 is a diagram of an activity flow chart 30 that may be related to flow chart 20 in FIG. 11. Since the generic data points are common between Lon and BACnet, values may be updated to a matching data point to a target device while importing data, as indicated by symbol 31. Symbol 32 notes that software may be used to update the value to the actual network variable/object once the data are imported, so that the device may propagate network specific values using an intended network variable/object managed by the software tool.

Figure 13:
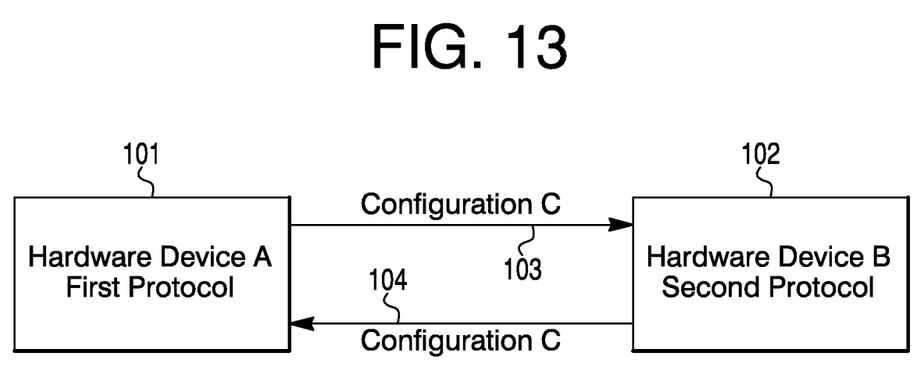
FIG. 13 is a diagram of an illustrative example of a layout of the present system.

FIG. 13 is a diagram of hardware that may be, for example, VAVs or another kind of devices revealing an export of a configuration by one device of one protocol and an import of the configuration by another device of another protocol, without internal protocol specific details being apparent to a user. The internal specific details may be handled by a tool.

For instance, a hardware device A 101 of a first protocol may export a configuration C along a path 103 that is imported by a hardware device B 102 of a second protocol. Configuration C may in turn be exported from hardware device B 102 along a path 104 to be imported by hardware device A 101.

To recap, a protocol independent mechanism may incorporate a first device having a first protocol, a second device having a second protocol, and generic data points defined under the first device to store network variable values. The first device may have a configuration that is conveyed to the second device. The generic data points may hide a network variable interface configuration from a user.

The generic data points may be configured for the first device. Values from the generic data points may be converted to network variables to hide complexity due to internal protocol specific details which are processed internally by a processor at the first device.

The values from the generic data points configured for the first device may be exported.

The generic data points may be mapped to the network variables.

The values from the generic data points that are exported may be imported by the second device.

The values may be exported by the second device and be imported by the first device.

An approach in a protocol independent configuration environment, may incorporate defining a first component having a first protocol, defining a second component having a second protocol, defining generic data points under the first component to store network variable values, hiding a network variable interface configuration from a user with the generic data points, configuring the generic data points for a first component configuration, converting values from the generic data points to network variables, and exporting values from the generic data points defined in the first component.

The values from the generic data points defined in the first component may represent a configuration of the first component.

The approach may further incorporate importing the configuration of the first component to the second component.

The approach may further incorporate mapping the generic data points to network variables.

The approach may further incorporate importing the configuration back to the first component from the second component.

The approach may further incorporate updating values of the network variables upon importing the configuration to the second component.

The first protocol may be LON. The second protocol may be BACnet. The first and second components may be VAV boxes.

A system having a protocol independent configuration environment may incorporate a first component that defines a first protocol device, and a second component that defines a second protocol device. Generic data points may be defined under the devices to store network variable values.

The generic data points may be used to hide a network variable interface configuration from a user.

The generic data points may be configured for a device configuration by a user.

There may be a conversion or propagation of values from the generic data points to network variables while hiding specific protocol details from a user.

The values from the generic data points defined under one device may be exported by a user.

Internal mapping of the generic data points to the network variables may occur based on a purpose of the network variable interface configuration to hide the specific protocol details from the user.

The values of the generic data points defined in the device may be imported into another device.

Generic data points may be common between the first protocol and the second protocol. The values from the generic data points of a device exporting configuration information may be used to update the values of matching generic data points of a device importing the configuration information.

The values of the network variables may be updated upon importing the configuration information to the device.

One protocol of the first and second protocols may be LON. Another protocol of the first and second protocols may be BACnet. The devices may be VAV boxes of an HVAC system.

U.S. Pat. No. 8,793,668, issued Jul. 29, 2014, is hereby incorporated by reference. U.S. Pat. No. 8,640,120, issued Jan. 28, 2014, is hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A controller for configuring devices of a Heating Ventilation and Air Conditioning (HVAC) system, the controller comprising:
an actuator; and
a power unit; and
wherein the controller is configured to:
identify that first generic data points defined under a first device of the HVAC system have been exported;
identify that the first device has a first protocol based the first generic data points;
determine the first device has a first configuration in accordance with the first protocol;
store network variable values to retain the first configuration;
identify a request has been made by a second device of the HVAC system to import the network variable values;
determine the second device has a second protocol in response to the identification that the request has been made by the second device;
map the network variable values to the second device to convey the first configuration of the first device to the second device; and
update, based on the mapping, the first generic data points to second generic data points defined under the second device providing the second device with a second configuration in accordance with the second protocol.

2. The controller of claim 1, further configured to hide a network variable interface configuration using the first and second generic data points.

3. The controller of claim 1, wherein the first generic data points are converted to the network variable values to hide a complexity due to internal protocol specific details which are processed internally by a processor of the first device.

4. The controller of claim 1, wherein the controller is further configured to store the first configuration of the first device and the second configuration of the second device.

5. The controller of claim 4, wherein when additional requests are made by the first device for additional network variable values from the second device, the network variable values are automatically translated into the first protocol.

6. The controller of claim 1, wherein when additional requests are made by the second device for additional network variable values from the first device, the network variable values are automatically translated into the second protocol.

7. The controller of claim 1, further configured to map the first generic data points to the network variables.

8. The controller of claim 1, wherein: the first protocol is LON; the second protocol is BACnet; and the first and second devices are VAV boxes.

9. A method for configuring devices of a Heating Ventilation and Air Conditioning (HVAC) system, the method comprising:
- identifying that first generic data points defined under a first device of the HVAC system have been exported;
- identifying that the first device has a first protocol based the first generic data points;
- determining the first device has a first configuration in accordance with the first protocol;
- storing network variable values to retain the first configuration;
- identifying a request has been made by a second device of the HVAC system to import the network variable values;
- determining the second device has a second protocol in response to the identification that the request has been made by the second device;
- mapping the network variable values to the second device to convey the first configuration of the first device to the second device; and
- updating, based on the mapping, the first generic data points to second generic data points defined under the second device providing the second device with a second configuration in accordance with the second protocol.

10. The method of claim 9, further comprising hiding a network variable interface configuration using the first and second generic data points.

11. The method of claim 9, wherein the first generic data points are converted to the network variable values to hide a complexity due to internal protocol specific details which are processed internally by a processor of the first device.

12. The method of claim 9, further comprising storing the first configuration of the first device and the second configuration of the second device.

13. The method of claim 12, wherein when additional requests are made by the first device for additional network variable values from the second device, the network variable values are automatically translated into the first protocol.

14. The method of claim 13, wherein when additional requests are made by the second device for additional network variable values from the first device, the network variable values are automatically translated into the second protocol.

15. The method of claim 9, further comprising mapping the first generic data points to the network variables.

16. The method of claim 9, wherein:
- the first protocol is LON;
- the second protocol is BACnet; and
- the first and second devices are VAV boxes.

17. A system for configuring devices of a Heating Ventilation and Air Conditioning (HVAC) system, the system comprising:
- a first device of the HVAC system;
- a second device of the HVAC system; and
- a controller operatively coupled to the first and second devices, the controller configured to:
  - identify that first generic data points defined under the first device have been exported;
  - identify that the first device has a first protocol based the first generic data points;
  - determine the first device has a first configuration in accordance with the first protocol;
  - store network variable values to retain the first configuration;
  - identify a request has been made by the second device to import the network variable values;
  - determine the second device has a second protocol in response to the identification that the request has been made by the second device;
  - map the network variable values to the second device to convey the first configuration of the first device to the second device; and
  - update, based on the mapping, the first generic data points to second generic data points defined under the second device providing the second device with a second configuration in accordance with the second protocol.

18. The system of claim 17, further configured to hide a network variable interface configuration using the first and second generic data points.

19. The system of claim 17, wherein the controller is further configured to:
- store the first configuration of the first device and the second configuration of the second device;
- identify a request has been for additional network variable values;
- determine the identity of a device making the request is either the first device or the second device; and
- translate the additional network variable values into a protocol for the device in response to determining the identity of the device.

20. The system of claim 17, wherein the controller is further configured to map the first generic data points to the network variables.

* * * * *